(12) United States Patent
Chang et al.

(10) Patent No.: US 8,068,462 B2
(45) Date of Patent: Nov. 29, 2011

(54) METHOD AND APPARATUS FOR RETRANSMITTING DATA BASED ON ANTENNA SCHEDULING IN MIMO SYSTEM

(75) Inventors: Kyung Hi Chang, Seoul (KR); Kyu Hyun Kim, Jeollabuk-do (KR); Seung Won Kang, Seoul (KR)

(73) Assignee: Inha Industry Partnership Institute, Incheon (KR)

( * ) Notice: Subject to any disclaimer, the term of this patent is extended or adjusted under 35 U.S.C. 154(b) by 1011 days.

(21) Appl. No.: 12/003,190

(22) Filed: Dec. 20, 2007

(65) Prior Publication Data

US 2008/0248753 A1 Oct. 9, 2008

(30) Foreign Application Priority Data

Apr. 6, 2007 (KR) .......................... 10-2007-0034314

(51) Int. Cl.
*H04W 4/00* (2009.01)
(52) U.S. Cl. .......... 370/334; 370/242; 370/249; 455/69; 455/101
(58) Field of Classification Search .................. 370/252, 370/394, 218, 236, 335, 341, 242, 249, 334; 455/69, 63.1, 101, 103
See application file for complete search history.

(56) References Cited

U.S. PATENT DOCUMENTS

| | | | |
|---|---|---|---|
| 6,977,888 B1 * | 12/2005 | Frenger et al. ................. | 370/218 |
| 7,773,523 B2 * | 8/2010 | Yamasaki ...................... | 370/236 |
| 2003/0039220 A1 | 2/2003 | Kwak et al. | |
| 2003/0147371 A1 * | 8/2003 | Choi et al. .................... | 370/341 |
| 2004/0240416 A1 * | 12/2004 | Derryberry et al. .......... | 370/335 |
| 2005/0207345 A1 | 9/2005 | Onggosanusi et al. | |
| 2008/0108310 A1 * | 5/2008 | Tong et al. ...................... | 455/69 |
| 2009/0046802 A1 * | 2/2009 | Subramaniam et al. ...... | 375/267 |

FOREIGN PATENT DOCUMENTS

| | | |
|---|---|---|
| EP | 1 545 041 A3 | 11/2006 |
| KR | 10-2006-0074014 | 6/2006 |
| KR | 1020060074014 A | 6/2006 |
| KR | 1020060134058 A | 12/2006 |

* cited by examiner

*Primary Examiner* — Dang Ton
*Assistant Examiner* — Mandish Randhawa
(74) *Attorney, Agent, or Firm* — LRK Patent Law Firm

(57) ABSTRACT

Provided is a method for retransmitting data based on antenna scheduling in a MIMO system to which a spatial multiplexing technique is applied. The method includes the steps of: (a) at a transmitter side, modulating an input packet into transmittable data to transmit to a receiver side; (b) at the receiver side, estimating channel values from the packet transmitted from the transmitter side, and selecting transmitting and receiving antennas for transmitting the next packet from the estimated channel values; (c) detecting whether an error is present in the packet or not, and transmitting a feedback signal to the transmitter side, the feedback signal including information on whether or not to transmit the packet and a list of the selected transmitting antennas; and (d) at the transmitter side, retransmitting the transmitted packet or transmitting the next packet through the transmitting antennas designated by the receiver side depending on the feedback signal.

32 Claims, 8 Drawing Sheets

METHOD AND APPARATUS FOR RETRANSMITTING DATA BASED ON ANTENNA SCHEDULING IN MIMO SYSTEM

CROSS-REFERENCE TO RELATED APPLICATIONS

This application claims the benefit of Korean Patent Application 10-2007-0034314 filed with the Korea Intellectual Property Office on Apr. 6, 2007, the disclosure of which is incorporated herein by reference.

BACKGROUND OF THE INVENTION

1. Field of the Invention

The present invention relates to a method and apparatus for retransmitting data based on antenna scheduling in a MIMO (Multiple Input Multiple Output) system.

2. Description of the Related Art

Recently, as the mobile communication technology rapidly develops, a technique for increasing transfer speed of data to provide a service with a more enhanced quality is considered to be important. IMT-2000, which is the third-generation wireless communication, requires transfer speed of more than 10 Mbps during stop mode and more than 384 Kbps during moving mode. Further, the post-fourth-generation wireless communication requires transfer speed of more than 155 Mbps during stop mode and more than 2 Mbps during moving mode.

To satisfy such requirements, a MIMO system has been proposed which uses a plurality of antennas provided in both transmitter and receiver sides. The MIMO technique is divided into a spatial multiplexing scheme and a spatial diversity scheme. In the spatial multiplexing scheme, a transmitter and a receiver respectively have a plurality of antennas provided therein so as to simultaneously transmit data different from each other. Without increasing the bandwidth of the system, the data can be transmitted at high speed. In the spatial diversity scheme, identical data is transmitted through a plurality of transmitting antennas so as to obtain a transmission diversity gain.

The MIMO system can significantly enhance a communication capacity and transmission/reception performance and can provide a high transmission rate, without additional frequency allocation or increase in power. Researches on the MIMO system are actively carried out. The MIMO system is considered as a core technology of the next generation communication. However, the MIMO system is vulnerable to ISI (InterSymbol interference) generated during high-speed transfer of signals and frequency selective fading of frequency caused by multiple paths. Therefore, to overcome such a disadvantage, an OFDM (Orthogonal Frequency Division Multiplexing) scheme is used together in the MIMO system.

The OFDM scheme attracts attention as a method which can satisfy high speed, a high quality, and large-volume communication required by the fourth-generation communication system. Since an OFDM signal has a plurality of sub-carriers in a frequency region and data is transmitted in parallel, the overall transfer speed is maintained as it is, and the transfer speed per sub-carrier can be reduced. Further, when a high-speed data stream is transmitted using a low-speed parallel carrier wave, a symbol interval is increased, so that the ISI is reduced. In particular, as a guard interval (GI) is used, the ISI can be almost perfectly removed. Further, as a plurality of carrier waves are used in the OFDM signal, the OFDM signal is not affected by the frequency selective fading. As two of the systems are combined, the advantage of the MIMO system is used as it is, and the disadvantage of the MIMO system can be removed by the OFDM system. This system is referred to as a MIMO-OFDM system.

Meanwhile, as an error control means for overcoming a packet transmission error which frequently occurs in a poor wireless channel when data is transmitted and received through the MIMO system, an ARQ (Automatic Repeat reQuest) protocol has been proposed. Recently, as a method for maximizing the efficiency, a hybrid ARQ (HARQ) protocol is being adopted as the standard protocol. In the HARQ protocol in which forward error correction (FEC) and the ARQ protocol are combined, error correction is performed by a receiver side through the FEC. If the error correction is failed, retransmission is carried out.

The HARQ protocol can be roughly divided into two schemes. The first scheme is referred to as a chase combining scheme. In the chase combining scheme, when an error is present in a received packet, a request for retransmission of the packet is delivered to a transmitter side. Then, the retransmitted packet and the packet having the error are combined so as to judge whether an error is present in the packet. The second scheme is referred to as an incremental redundancy (IR) scheme. In the IR scheme, a packet in which an error occurred is not retransmitted, but only additional redundancy bits are retransmitted so as to be combined with the packet where an error occurred. In this case, different redundancy bits are retransmitted at every transmission.

As the HARQ scheme is applied to the MIMO-OFDM system, an error of a packet can be effectively corrected in comparison with an existing MIMO-OFDM system, thereby enhancing the reliability of the system. In the HARQ scheme of the conventional MIMO-OFDM system, however, the packet where the error occurred is retransmitted through the same antenna. Therefore, when an error occurs in a packet transmitted through a specific antenna, an error may again occur in the packet retransmitted through the same antenna, thereby reducing the yield rate of the entire system. Further, when the retransmission is continuously requested due to some poor communication links, the entire system may be paralyzed in some cases.

SUMMARY OF THE INVENTION

An advantage of the present invention is that it provides a method and apparatus for retransmitting data based on antenna scheduling in a MIMO (Multiple Input Multiple Output) system, which retransmits a packet through antennas with a high channel gain by scheduling the antennas on the basis of a transmitting and receiving antenna selection scheme in which a favorable communication link is adaptively selected depending on the channel state of the MIMO system, thereby enhancing the reliability of the system.

Additional aspects and advantages of the present general inventive concept will be set forth in part in the description which follows and, in part, will be obvious from the description, or may be learned by practice of the general inventive concept.

According to an aspect of the invention, a method for retransmitting data based on antenna scheduling in a MIMO system, to which a spatial multiplexing technique is applied, comprises the steps of: (a) at a transmitter side, modulating an input packet into transmittable data to transmit to a receiver side; (b) at the receiver side, estimating channel values from the packet transmitted from the transmitter side, and selecting transmitting and receiving antennas for transmitting the next packet from the estimated channel values; (c) detecting whether an error is present in the packet or not, and transmitting a feedback signal to the transmitter side, the feedback signal including information on whether or not to transmit the packet and a list of the selected transmitting antennas; and (d) at the transmitter side, retransmitting the transmitted packet or transmitting the next packet through the transmitting antennas designated by the receiver side depending on the feedback signal.

According to another aspect of the invention, an apparatus for retransmitting data based on antenna scheduling in a MIMO system, to which a spatial multiplexing technique is applied, comprises a transmitter side including: a packet modulating unit that converts an input packet into transmittable data; a scheduler that determines whether or not to retransmit the packet and an encoding rate of the packet from a feedback signal transmitted from a receiver side, and delivers a transmitting antenna list, received from the receiver side, to a transmitting antenna designating unit; and the transmitting antenna designating unit that designates transmitting antennas for transmitting the packet, depending on the transmitting antenna list; and the receiver side including: a channel estimator that estimates channel values from the packet transmitted from the transmitter side; an antenna selecting unit that selects transmitting and receiving antennas for transmitting the next packet from the estimated channel values; a packet demodulating unit that detects whether an error occurs in the packet or not; and a feedback transmission unit that transmits a feedback signal to the transmitter side, the feedback signal including information on whether or not to retransmit the packet and the transmitting antenna list.

According to a further aspect of the invention, a method for retransmitting data based on antenna scheduling in a MIMO system, to which a spatial diversity technique is applied, comprises the steps of: (a) at a transmitter side, modulating an input packet into transmittable data to transmit to a receiver side; (b) at the receiver side, estimating channel values from the packet transmitted from the transmitter side, and selecting transmitting and receiving antennas for transmitting the next packet from the estimated channel values; (c) detecting whether an error is present in the packet or not, and transmitting a feedback signal to the transmitter side, the feedback signal including information on whether or not to retransmit the packet, a list of the selected transmitting antennas, and channel-state values; and (d) at the transmitter side, retransmitting the transmitted packet or transmitting the next packet through the transmitting antennas designated by the receiver side depending on the feedback signal.

According to a still further aspect of the invention, an apparatus for retransmitting data based on antenna scheduling in a MIMO system, to which a spatial diversity technique is applied, comprises a transmitter side including: a packet modulating unit that converts an input packet into transmittable data; a scheduler that determines whether or not to retransmit the packet and an encoding rate of the packet from a feedback signal transmitted from a receiver side, and delivers a transmitting antenna list, received from the receiver side, to a transmitting antenna designating unit; and the transmitting antenna designating unit that designates transmitting antennas for transmitting the packet depending on the transmitting antenna list; and the receiver side including: a channel estimator that estimates channel values from the packet transmitted from the transmitter side; an antenna selecting unit that selects transmitting and receiving antennas for transmitting the next packet from the estimated channel values; a packet demodulating unit that detects whether an error occurs in the packet or not; and a feedback transmission unit that transmits a feedback signal to the transmitter side, the feedback signal including information on whether or not to retransmit the packet, the transmitting antenna list, and channel state values.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

Hereinafter, embodiments of the present invention will be described in detail with reference to the accompanying drawings.

Figure 1:
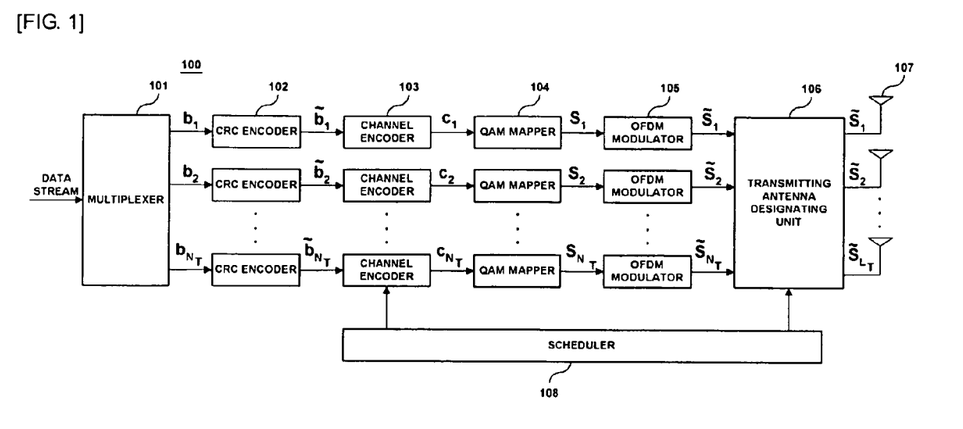
FIG. 1 is a diagram showing the transmitter-side configuration of a MIMO system, to which a spatial multiplexing technique is applied, according to an embodiment of the invention.

FIG. 1 is a diagram showing the transmitter-side configuration of a MIMO system, to which a spatial multiplexing technique is applied, according to an embodiment of the invention.

As shown in FIG. 1, the transmitter side 100 of the MIMO system includes a multiplexer 101 for multiplexing one input data sequence into a plurality of data having the same length, a plurality of CRC (Cyclic Redundancy Check) encoders 102 which add CRC codes for error detection to the data, a plurality of channel encoders 103 for correcting errors through channel fading, a plurality of QAM (Quadrature Amplitude Modulation) mappers 104, a plurality of OFDM modulators 105, a transmission antenna designating unit 106 for selecting transmitting antennas with an excellent communication link, a plurality of antennas 107, and a scheduler 108 which adjusts a channel encoding rate and schedules antennas, through which a packet is to be transmitted, by using a feedback signal.

In FIG. 1, $b_j$ represents an information bit stream, $\tilde{b}_j$ represents a CRC-encoded information bit stream, $c_j$ represents a channel-encoded bit stream, $s_j$ represents a QAM-mapped symbol, and $\tilde{s}_j$ represents an OFDM symbol ($j=1, 2, \ldots, N_T$).

First, the multiplexer 101 multiplexes a packet input to the transmitter side 100 into a plurality of data having the same length, and the CRC encoders 102 add CRC codes for error detection to the data. A generator polynomial of the CRC codes is expressed by Equation 1.

$$G_{CRC_{24}}(D) = D^{24} + D^{23} + D^6 + D^5 + D + 1 \quad \text{[Equation 1]}$$

The CRC generator polynomial is determined by the MAC (Medium Access Control) layer of the system. If necessary, another polynomial between the transmitter and receiver sides may be defined and used.

The channel encoders 103 encode the data, to which the CRC codes are added, by using ACK (Acknowledgement) values received from the scheduler 108. At this time, when the encoding is performed, a chase combining scheme is applied to the data of which the ACK value is 0, and an incremental redundancy (IR) scheme is applied to the data of which the ACK value is 1.

The scheduler 108 determines whether or not to retransmit the packet by using the ACK values received from a receiver side, schedules a channel encoding rate and the antennas 107 through which the packet is to be retransmitted, and selects the chase combining scheme or the IR scheme depending on the ACK values received from the receiver side so as to retransmit the encoded data to the selected transmission antennas 107.

Figure 2:
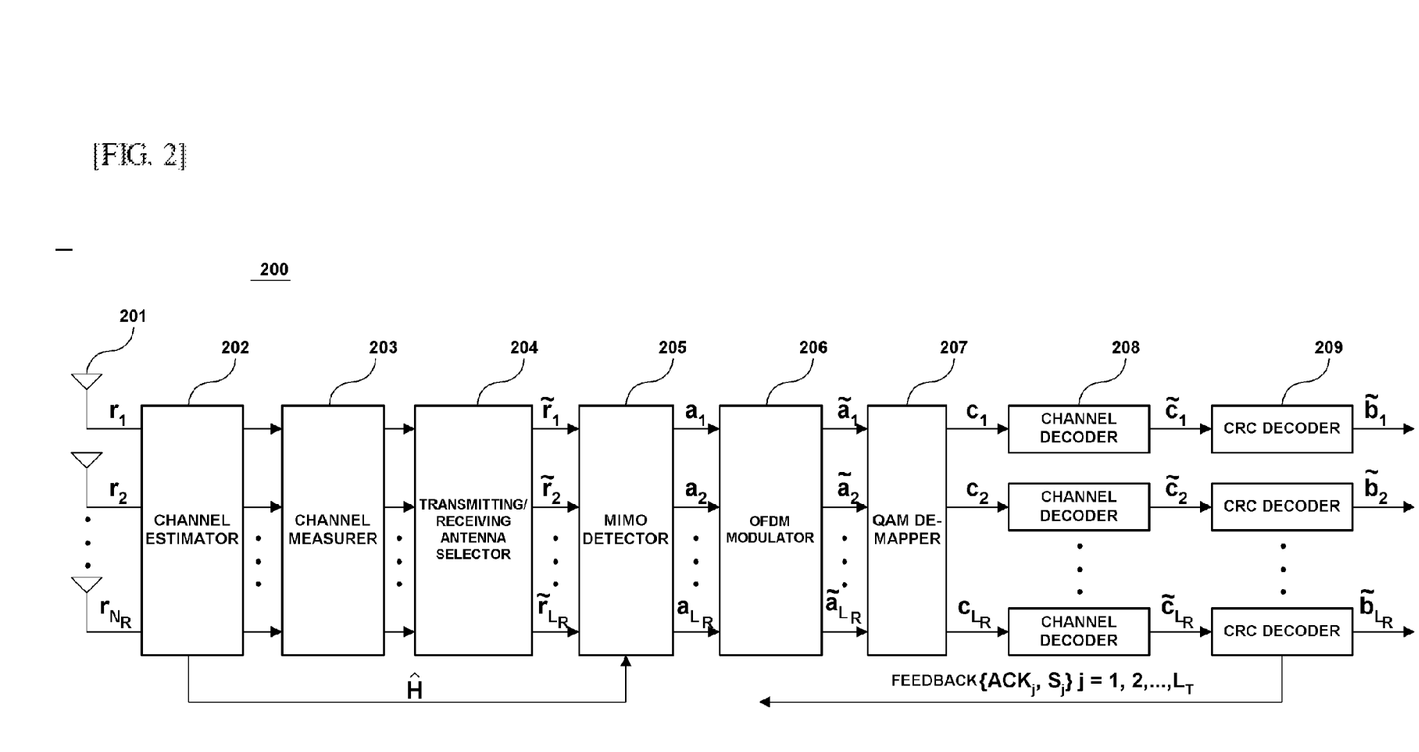
FIG. 2 is a diagram showing the receiver-side configuration of the MIMO system, to which the spatial multiplexing technique is applied, according to an embodiment of the invention.

FIG. 2 is a diagram showing the receiver-side configuration of the MIMO system, to which the spatial multiplexing technique is applied, according to an embodiment of the invention.

As shown in FIG. 2, the receiver side 100 of the MIMO system includes a plurality of antennas 201, a channel estimator 202 which estimates channel values from the packet transmitted from the transmitter side, a channel measurer 203 which calculates channel sums or channel norms from the channel values, a transmitting/receiving antenna selector 204 which selects antennas by using the channel sums or channel norms, a MIMO detector 205, an OFDM demodulator 206, a QAM de-mapper 207, a plurality of channel decoders 208, a plurality of CRC decoders 209 for checking whether an error occurs in the received packet or not, and a feedback transmission unit (not shown) which transmits a feedback signal to the transmitter side, the feedback signal including an ACK value of the packet for each transmitting antenna and a list of transmitting antennas.

The channel measurer 203 calculates channel sums or channel norms by using the channel values estimated by the channel estimator 202. The channel sums for each transmitting antenna and each receiving antenna are calculated by Equations 2 and 3, respectively. The channel norms for each transmitting antenna and each receiving antenna are calculated by Equations 4 and 5, respectively.

$$CHSum_{T_j} = \sum_{m=1}^{N_R} |H_{mj}|, \, j = 1, 2, \ldots, N_T \quad \text{[Equation 2]}$$

$$CHSsum_{R_i} = \sum_{n=1}^{N_T} |H_{in}|, \, i = 1, 2, \ldots, N_R \quad \text{[Equation 3]}$$

$$CHNorm_{T_j} = \sum_{m=1}^{N_R} \|H_{mj}\|^2, \, j = 1, 2, \ldots, N_T \quad \text{[Equation 4]}$$

$$CHNorm_{R_i} = \sum_{n=1}^{N_T} \|H_{in}\|^2, \, i = 1, 2, \ldots, N_R \quad \text{[Equation 5]}$$

Here, $CHSum_{T_j}$ represents the channel sum of a $j^{th}$ transmitting antenna, $CHSsum_{R_i}$ represents the channel sum of an $i^{th}$ receiving antenna, $CHNorm_{T_j}$ represents the channel norm of a $j^{th}$ transmitting antenna, $CHNorm_{R_i}$ represents the channel norm of an $i^{th}$ receiving antenna, H represents a channel value estimated from the received packet, $N_T$ represents the number of transmitting antennas, and $N_R$ represents the number of receiving antennas.

By using the channel sums or channel norms calculated by Equations 2 to 5, the transmitting/receiving antenna selector 204 selects a predetermined number ($L_T \times L_R$) of transmitting and receiving antennas of which the channel sum or channel norm is large, as expressed by Equation 6.

$$\operatorname*{argmax}_{i,j} \{CHSum_{T_j}, CHSum_{R_i}\}, \quad \text{[Equation 6]}$$

$$i = 1, 2, K, N_R,$$

$$j = 1, 2, K, N_T$$

$$\operatorname*{argmax}_{j,j} \{CHNorm_{T_j}, CHNorm_{R_i}\},$$

$$i = 1, 2, K, N_R,$$

$$j = 1, 2, K, N_T$$

The CRC decoder 209 determines an ACK value of the packet by checking through the CRC generator polynomial whether an error occurs in the received packet or not. The CRC equation is expressed by Equation 7.

$$P(x) = Q(x) \times G(x) + R(x) \quad \text{[Equation 7]}$$

Here, P(x) represents an information polynomial, G(x) represents a CRC generator polynomial, Q(x) represents a quotient, and R(x) represents a remainder. When R(x) is 0, it indicates that an error did not occur in the received packet.

The ACK value is determined by Equation 8.

$$ACK_j = \begin{cases} 0, & R(x) = 0 \\ 1, & R(x) \neq 0 \end{cases}, \, j = 1, 2, \ldots, L_T \quad \text{[Equation 8]}$$

After the CRC decoding is completed, the receiver side 200 feeds back to the transmitter side 100 the indexes of transmitting antennas through which the ACK values and the packet are to be transmitted.

Figure 3:
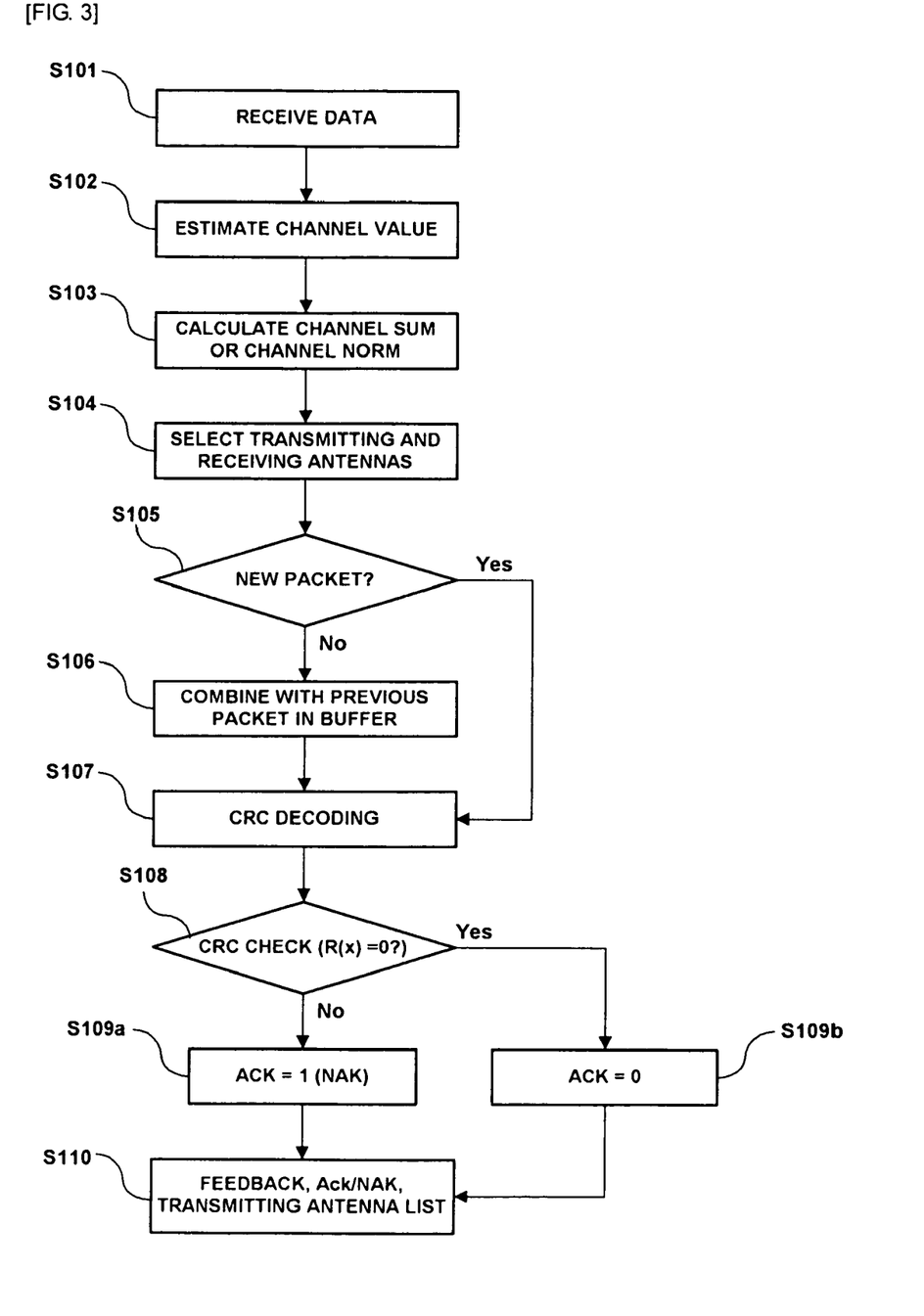
FIG. 3 is a flow chart showing an operation in the receiver side of the MIMO system, to which the spatial multiplexing technique is applied, according to an embodiment of the invention.

FIG. 3 is a flow chart showing an operation in the receiver side of the MIMO system, to which the spatial multiplexing technique is applied, according to an embodiment of the invention.

First, when data are received from the transmitter side (step S101), channel values for the received data are estimated (step S102), and channel sums or channel norms are calculated using the estimated channel values (step S103). Then, a predetermined number ($L_T \times L_R$) of antennas having a high channel gain are selected using the calculated channel sums or channel norms (step S104).

Next, it is checked whether the received packet is a new packet or not (step S105). When the packet is a retransmitted packet, the packet is combined with a previous packet stored in a buffer (step S106). When the packet is a new packet, step S106 is not performed, but step S107 which will be described below is performed.

In step S107 where the CRC decoding is performed, CRC codes are extracted from the received packet. Then, it is detected through the CRC code whether an error occurs in the received packet or not (step S108). When an error occurred in the received packet, 1 is allocated as an ACK value (step S109a). When an error did not occur in the received packet, 0 is allocated as an ACK value (step S109b).

Finally, the ACK values determined in step S109a or S109b and the list of transmitting antennas determined in step S104 are fed back to the transmitter side (step S110).

Figure 4:
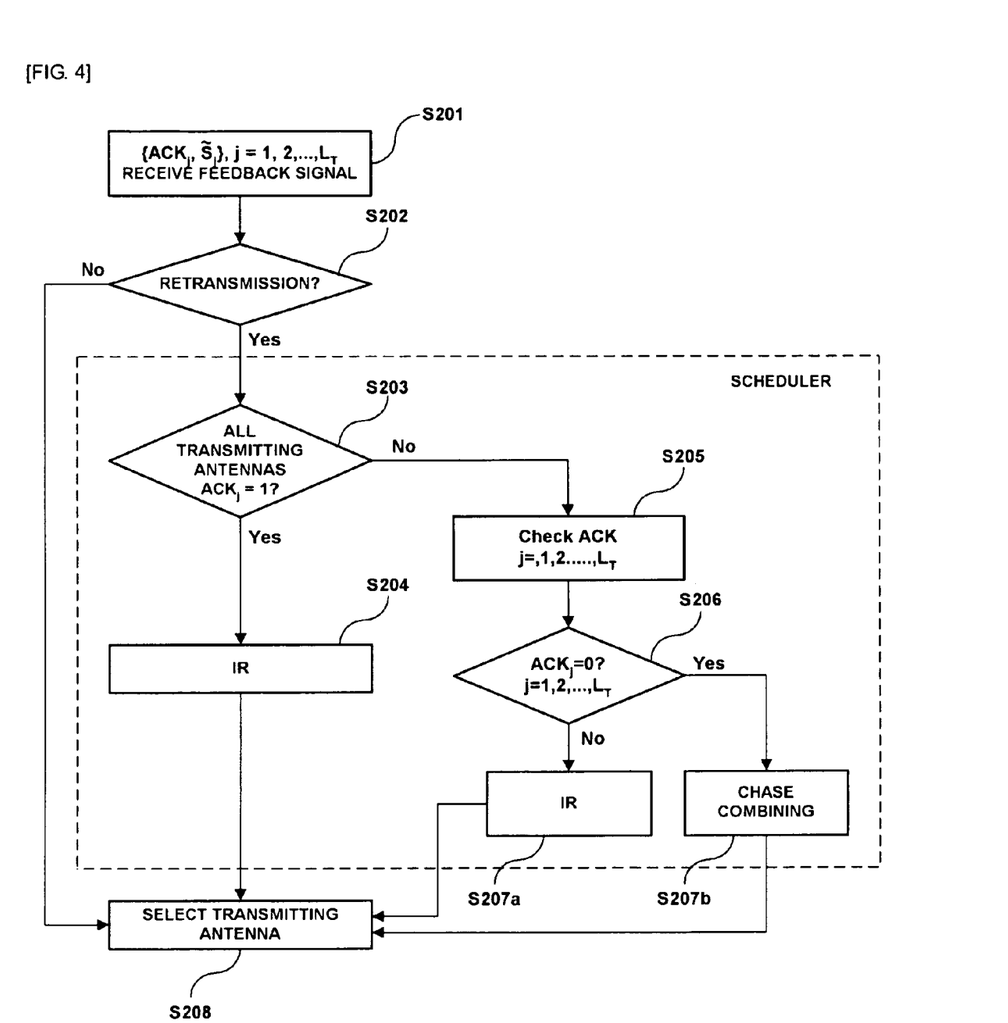
FIG. 4 is a flow chart showing an operation in the transmitter side of the MIMO system, to which the spatial multiplexing technique is applied, according to an embodiment of the invention.

FIG. 4 is a flow chart showing an operation in the transmitter side of the MIMO system, to which the spatial multiplexing technique is applied, according to an embodiment of the invention.

First, when the feedback signal is received from the receiver side (step S201), the fed-back ACK values are checked so as to determine whether or not to retransmit the packet (step S202). At this time, when any one of the ACK values is 1, it is judged that the retransmission is necessary, and the process proceeds to step S203 which will be described below. When the ACK values are all 0, new data is transmitted to the receiver side through the transmitting antennas designated by the receiver side in accordance with the feedback signal (step S208).

When it is judged in step S202 that the retransmission is necessary, it is checked whether the ACK values of all the transmitting antennas are 1 or not (step S203). When the ACK values of all the transmitting antennas are 1, it means that errors occur in the signals transmitted through the all the transmitting antennas. In this case, the IR scheme for increasing the encoding rate of the channel encoders is applied to the packet which is to be retransmitted (step S204). Then, new data is transmitted to the receiver side through the transmitting antennas designated by the receiver side (step S208).

Meanwhile, when it is judged in step S203 that the ACK values of all the transmitting antennas are not 1, that is, when some of the ACK values are 1 and the others are 0, the ACK value of each transmitted data is discriminated (step S206). The IR scheme is applied to the data which is transmitted through the antenna of which the ACK value is 1 (step S207a), and the chase combining scheme is scheme is applied to the data which is transmitted through the antenna of which the ACK value is 0 (step S207b). Then, new data is transmitted to the receiver side through the transmitting antenna designated by the receiver side.

Figure 5:
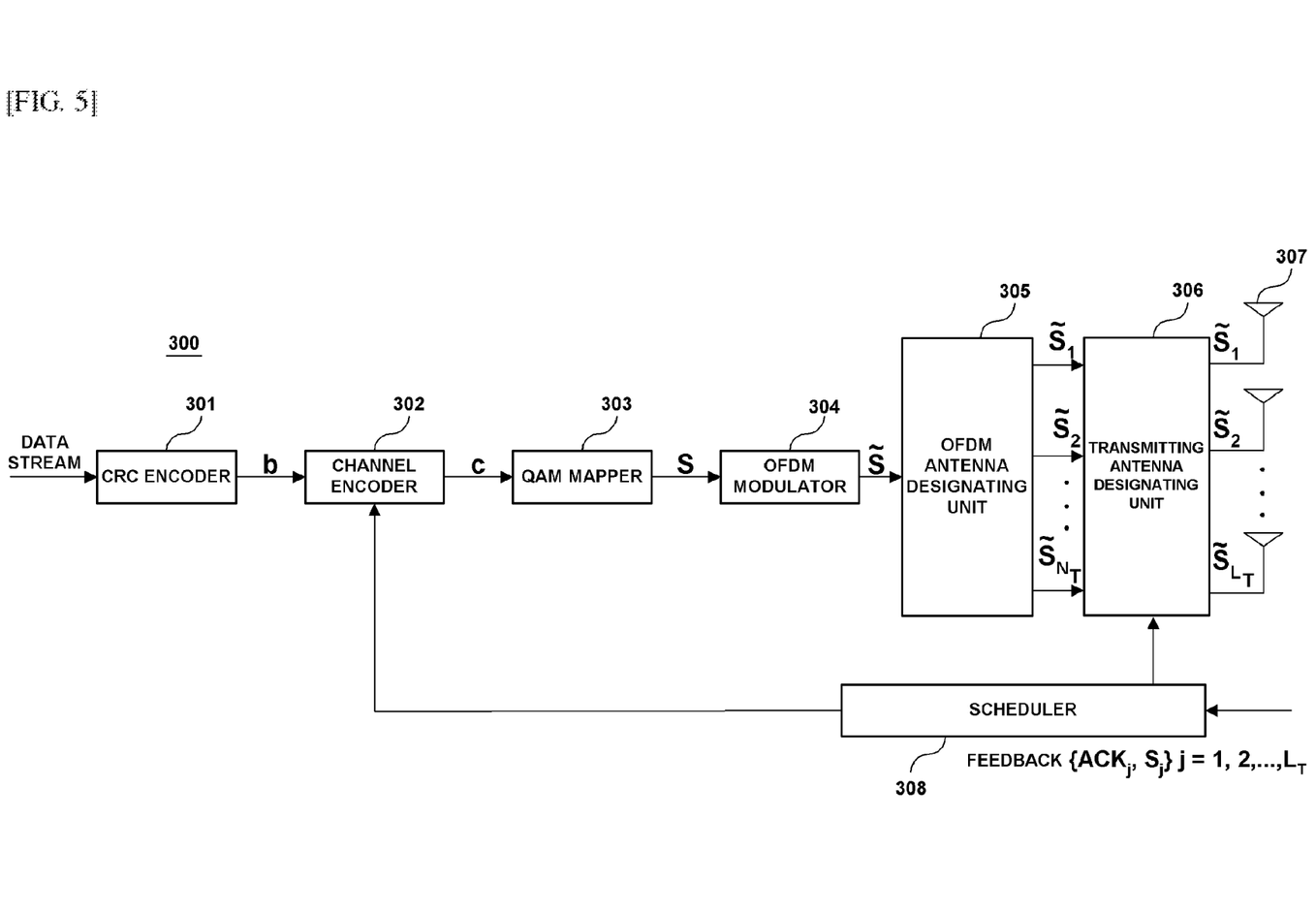
FIG. 5 is a diagram showing the transmitter-side configuration of a MIMO system, to which the spatial diversity scheme is applied, according to another embodiment of the invention.

FIG. 5 is a diagram showing the transmitter-side configuration of a MIMO system, to which the spatial diversity scheme is applied, according to another embodiment of the invention.

As shown in FIG. 5, the transmitter side 300 includes a CRC encoder 301 which adds a CRC code for error detection to data, a channel encoder 302 which corrects an error through channel fading, a QAM mapper 302, an OFDM modulator 304, an OFDM antenna designating unit 305 which transmits OFDM-modulated signals through a plurality of antennas, a transmitting antenna designating unit 306, a plurality of transmitting antennas 307, and a scheduler 308 which adjusts a channel encoding rate by using a feedback signal and schedules antennas through which a packet is to be transmitted.

In FIG. 5, b represents a CRC-encoded information bit stream, c represents a channel-encoded bit stream, s represents a QAM-mapped symbol, $\tilde{s}$ represents an OFDM symbol, $\tilde{s}_j$ represents an OFDM symbol designated to each transmitting antenna by the OFDM antenna designating unit 305 (j=1, 2, ..., $N_T$).

First, as shown in FIG. 5, the CRC encoder 301 adds a CRC code for error detection to a packet input to the receiver side 300. A generator polynomial of the CRC code is expressed by Equation 1 which has been described above.

The channel encoder 302 encodes the data, to which the CRC code is added, by using an ACK value received from the scheduler 308. In this case, the chase combining scheme is applied to the data of which the ACK is 0, and the IR scheme is applied to the data of which the ACK is 1.

When receiving the ACK value and a channel norm or channel sum for each antenna from the receiver side, the scheduler 308 arranges the transmitting antennas in magnitude order of the channel norms or channel sums. Then, retransmission is performed through the transmitting antenna having the greatest channel norm or channel sum, among the transmitting antennas of which the ACK value is 0. If an antenna of which the ACK value is 0 is not present, the channel encoding rate is increased (using the IR scheme) so as to retransmit the packet.

Figure 6:
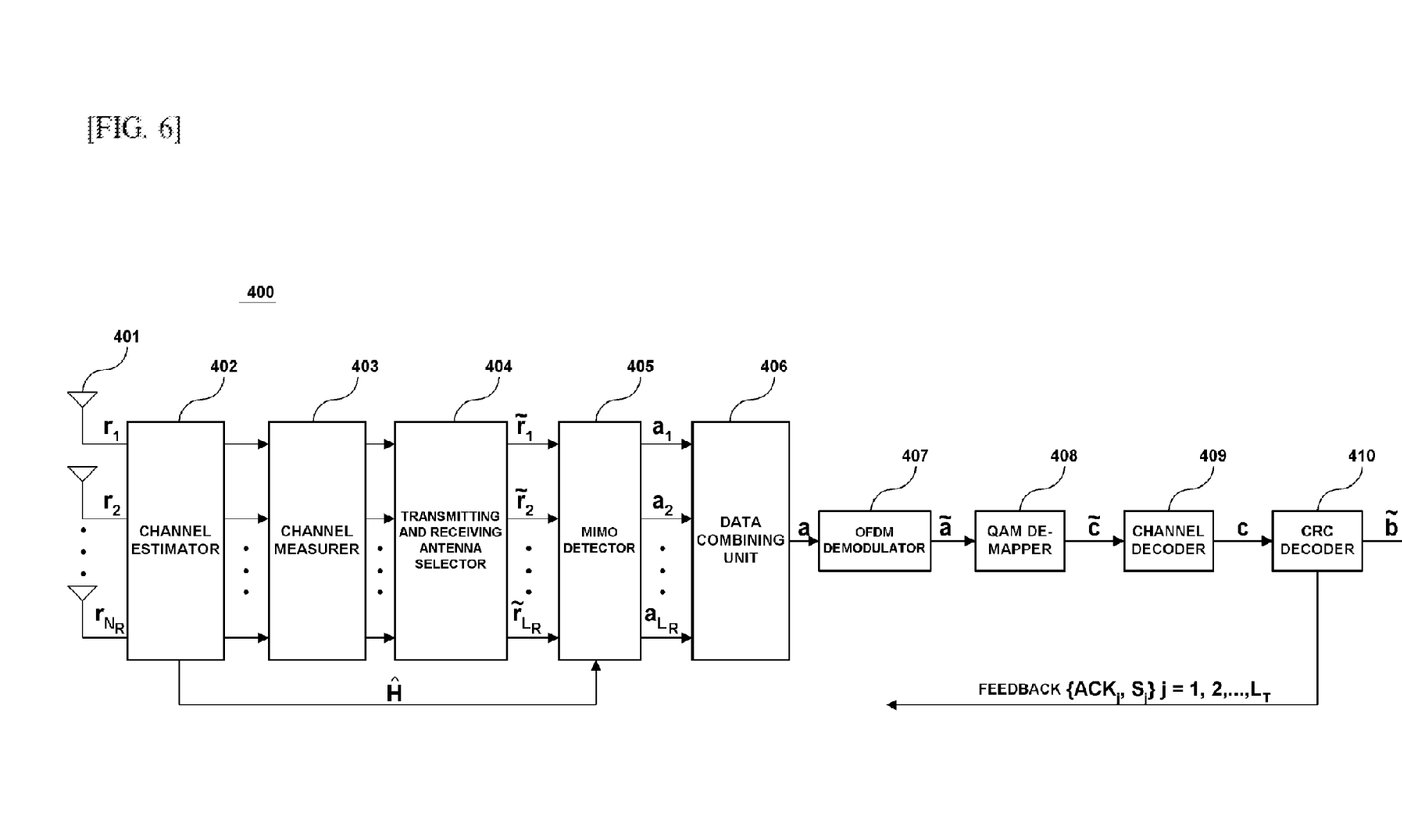
FIG. 6 is a diagram showing the receiver-side configuration of the MIMO system, to which the spatial diversity scheme is applied, according to another embodiment of the invention.

FIG. 6 is a diagram showing the receiver-side configuration of the MIMO system, to which the spatial diversity scheme is applied, according to another embodiment of the invention.

As shown in FIG. 6, the receiver side 400 includes a plurality of receiving antennas 401, a channel estimator 402 which estimates channel values from the packet transmitted from the transmitter side, a channel measurer 403 which calculates channel sums or channel norms from the channel values, a transmitting/receiving antenna selector 404 which selects antennas by using the channel sums or channel norms, a MIMO detector 405, a data combining unit 406 which combines signals received from the plurality of antennas, an OFDM demodulator 407, a QAM de-mapper 408, a channel decoder 409, a CRC encoder 410 for checking whether an error occurs in the received packet or not, and a feedback transmission unit which transmits a feedback signal to the transmitter side, the feedback signal including the ACK value of the packet, a list of transmitting antennas, and the channel sum or channel norm of each antenna.

The channel measurer 403 calculates channel sums or channel norms by using channel values estimated by the channel estimator 402. The channel sums or channel norms are calculated through Equations 2 to 5.

By using the channel sums or channel norms calculated through Equations 2 to 5, the transmitting/receiving antenna selector 404 selects a predetermined number ($L_T \times L_R$) of transmitting and receiving antennas of which the channel sum or channel norm is large, as expressed by Equation 6.

The CRC decoder 410 checks through the CRC generator polynomial whether an error occurs in the received packet or not, and then determines the ACK value of the packet. The CRC equation is expressed by Equation 7.

Further, the ACK value is determined by Equation 8.

After the CRC decoding is completed, the receiver side 400 feeds back to the transmitter side 300 the indexes of transmitting antennas through which the ACK value and the packet are to be transmitted.

Figure 7:
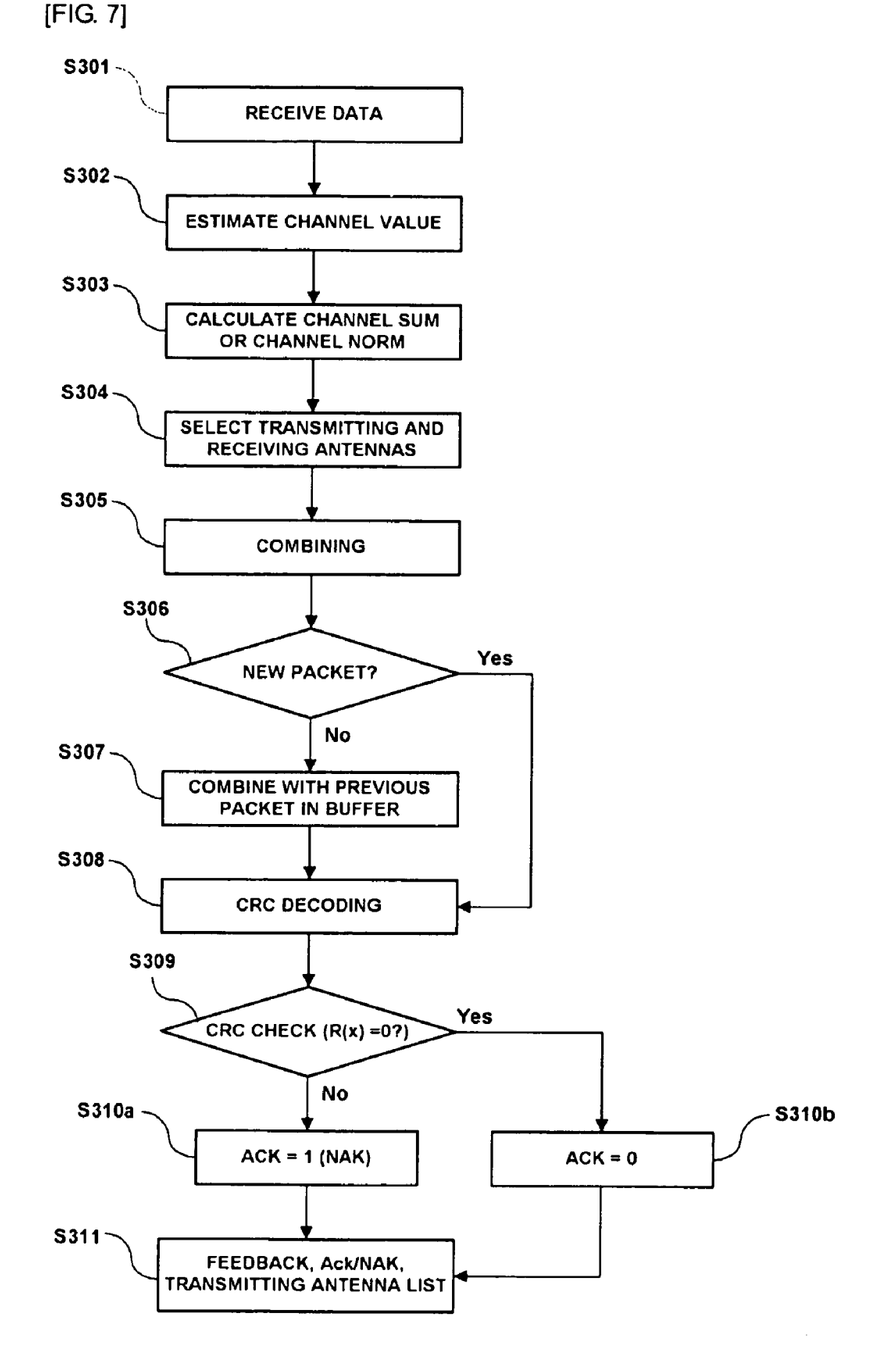
FIG. 7 is a flow chart showing an operation in the receiver side of the MIMO system, to which the spatial diversity technique is applied, according to another embodiment.

FIG. 7 is a flow chart showing an operation in the receiver side of the MIMO system, to which the spatial diversity technique is applied, according to another embodiment.

First, when data are received from the transmitter side (step S301), channel values for the received data are estimated (step S302), and channel sums or channel norms are calculated using the estimated channel values (step S303). Then, a predetermined number ($L_T \times L_R$) of antennas having a large channel gain are selected using the calculated channel sums or channel norms (step S304).

Next, signals received from the plurality of antennas are combined (step S305), and it is checked whether the received packet is a new packet or not (step S306). At this time, when the packet is a retransmitted packet, the packet is combined with a previous packet stored in a buffer (step S307). When the packet is a new packet, step S307 is not performed, and the process immediately proceeds to step S308 which will be described below.

In step S308 where CRC decoding is performed, CRC codes are extracted from the received packet. Then, it is detected through the CRC code whether an error is present in the received data or not (step S309). When an error is present in the received data, 1 is allocated as an ACK value (step S310a). When an error is not present in the received data, 0 is allocated as an ACK value (step S310b).

Finally, the ACK values determined in step S310a or S310b, the list of transmitting antennas determined in step S304, and the channel sum or channel norm of each transmitting antenna, which is calculated in step S303, are fed back to the transmitter side (step S311).

Figure 8:
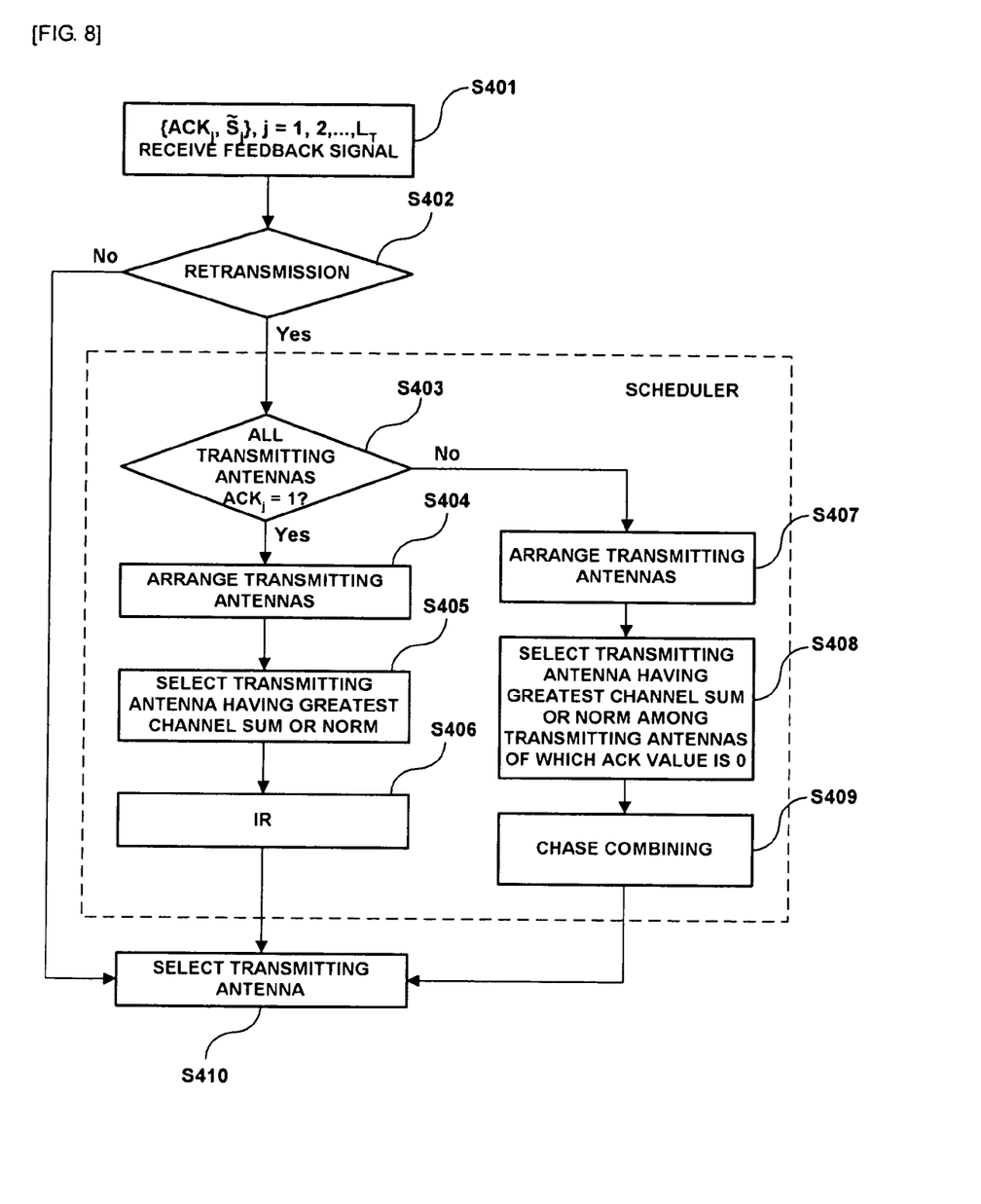
FIG. 8 is a flow chart showing an operation in the transmitter side of the MIMO system, to which the spatial diversity technique is applied, according to another embodiment of the invention.

FIG. 8 is a flow chart showing an operation in the transmitter side of the MIMO system, to which the spatial diversity technique is applied, according to another embodiment of the invention.

First, when the feedback signal is received from the receiver side (step S401), the received ACK values are checked so as to check whether or not to retransmit the packet or not (step S402). At this time, when any one of the ACK values is 1, it is judged that the retransmission is necessary, and the process proceeds to step S403 which will be described below. When the ACK values are all 0, new data is transmitted to the receiver side through the transmitting antennas designated by the receiver side depending on the feedback signal (step S410).

When it is judged in step S402 that the retransmission is necessary, it is checked whether the ACK values of all the transmitting antennas are 1 or not (step S403). When the ACK values of all the transmitting antennas are 1, the transmitting antennas are arranged in accordance with the fed-back channel norms or channel sums (step S404). Among them, the transmitting antenna with the greatest channel norm or channel sum is selected (step S405). Then, the IR scheme for increasing the encoding rate of the channel encoder is applied to the packet which is to be retransmitted (step S406), and new data is transmitted to the receiver side through the transmitting antenna selected in the step S405 (step S410).

Meanwhile, when it is judged in step S403 that the ACK values of all the transmitting antennas are not 1, that is, when some of the ACK values are 1 and the others are 0, the transmitting antennas are arranged in accordance with the fed-back channel norms or channel sums (step S407). Among the antennas of which the ACK value is 0, the transmitting antenna with the greatest channel norm or channel sum is selected (step S408). Then, the chase combining scheme is applied to the packet which is to be retransmitted (step S409), and new data is transmitted to the receiver side through the transmitting antenna selected in the step S408 (step S410).

According to the present invention, antennas with a favorable communication link are always selected by the antenna selection scheme. When retransmission is requested, the antennas are scheduled adaptively to the communication link so as to retransmit a packet. Therefore, it is possible to provide a higher retransmission probability than in the conventional system. Further, the reliability of the system can be enhanced, and the number of retransmissions can be reduced in comparison with the conventional method.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method for retransmitting data based on antenna scheduling in a MIMO system to which a spatial multiplexing technique is applied, the method comprising the steps of:

(a) at a transmitter side, modulating an input packet into transmittable data to transmit to a receiver side;

(b) at the receiver side, estimating channel values from the packet transmitted from the transmitter side, calculating channel sums or channel norms from the channel values, and selecting a predetermined number of transmitting and receiving antennas in magnitude order of the channel sums or channel norms, wherein the channel sums are calculated by the following equations:

$$CHSum_{T_j} = \sum_{m=1}^{N_R} |H_{mj}|, \; j = 1, 2, \ldots, N_T,$$

and $$CHSsum_{R_i} = \sum_{n=1}^{N_T} |H_{in}|, \; i = 1, 2, \ldots, N_R,$$

where $CHSum_{T_j}$ represents the channel sum of a $j^{th}$ transmitting antenna, $CHSsum_{R_i}$ represents the channel sum of an $i^{th}$ receiving antenna, H represents a channel value estimated from the received packet, $N_T$ represents the number of transmitting antennas, and $N_R$ represents the number of receiving antennas;

(c) detecting whether an error is present in the packet or not, and transmitting a feedback signal to the transmitter side, the feedback signal including information on whether or not to transmit the packet and a list of the selected transmitting antennas; and (d) at the transmitter side, retransmitting the transmitted packet or transmitting the next packet through the transmitting antennas designated by the receiver side depending on the feedback signal.

2. The method according to claim 1, wherein step (a) includes the steps of:

multiplexing the packet into a plurality of data having the same length;

adding CRC (Cyclic Redundancy Check) codes, used for error detection, to the data; and performing channel encoding so as to correct errors in the transmitting and receiving.

3. The method according to claim 1, wherein the channel norms are calculated by the following equations:

$$CHNorm_{T_j} = \sum_{m=1}^{N_R} \|H_{mj}\|^2, j = 1, 2, \ldots, N_T,$$

and $$CHNorm_{R_j} = \sum_{n=1}^{N_T} \|H_{in}\|^2, i = 1, 2, \ldots, N_R,$$

where $CHNorm_{T_j}$ represents the channel norm of a $j^{th}$ transmitting antenna, $CHNorm_{R_i}$ represents the channel norm of an $i^{th}$ receiving antenna, H represents a channel value estimated from the received packet, $N_T$ represents the number of transmitting antennas, and $N_R$ represents the number of receiving antennas.

4. The method according to claim 1, wherein step (c) includes the steps of:
performing channel decoding so as to convert the modulated packet into the original packet;
judging whether the packet is the retransmitted packet or not, and when the packet is the retransmitted packet, combining the packet with a previous packet stored in a buffer of the receiver side; and
extracting CRC codes from the packet, detecting through the extracted CRC codes whether or not an error occurs in the data transmitted from the respective transmitting antennas, setting an ACK value of the transmitting antenna to 1 when an error occurred in the data, and setting the ACK value to 0 when an error did not occurred in the data.

5. The method according to claim 4, wherein in step (c), whether or not to retransmit the packet, which is to be transmitted to the transmitter side, is determined by the ACK value.

6. The method according to claim 5, wherein in step (d), only when one or more of the ACK values received from the receiver side are 1, the packet is retransmitted.

7. The method according to claim 6, wherein step (d) includes the step of:
encoding channels by applying an incremental redundancy (IR) scheme to the packet, which is to be retransmitted, when the ACK values received from the receiver side are all 1 or by applying a chase combining scheme to data transmitted through the antenna of which the ACK value is 0 and applying the IR scheme to data transmitted through the antenna of which the ACK value is 1 when any one of the ACK values is 0.

8. A method for retransmitting data based on antenna scheduling in a MEMO system to which a spatial diversity technique is applied, the method comprising the steps of:
(a) at a transmitter side, modulating an input packet into transmittable data to transmit to a receiver side;
(b) at the receiver side, estimating channel values from the packet transmitted from the transmitter side, calculating channel sums or channel norms from the channel values, and selecting a predetermined number of transmitting and receiving antennas in magnitude order of the channel sums or channel norms, wherein the channel sums are calculated by the following equations:

$$CHSum_{T_j} = \sum_{m=1}^{N_R} |H_{mj}|, j = 1, 2, \ldots, N_T,$$

and $$CHSsum_{R_i} = \sum_{n=1}^{N_T} |H_{in}|, i = 1, 2, \ldots, N_R,$$

where $CHSum_{T_j}$ represents the channel sum of a $j^{th}$ transmitting antenna, $CHSsum_{R_i}$ represents the channel sum of an $i^{th}$ receiving antenna, H represents a channel value estimated from the received packet, $N_T$ represents the number of transmitting antennas, and $N_R$ represents the number of receiving antennas;
(c) detecting whether an error is present in the packet or not, and transmitting a feedback signal to the transmitter side, the feedback signal including information on whether or not to retransmit the packet, a list of the selected transmitting antennas, and channel-state values; and
(d) at the transmitter side, retransmitting the transmitted packet or transmitting the next packet through the transmitting antennas designated by the receiver side depending on the feedback signal.

9. The method according to claim 8, wherein step (a) includes the steps of:
adding CRC codes, used for error detection, to the packet; and
performing channel encoding so as to correct errors in the transmitting and receiving.

10. The method according to claim 8, wherein the channel-state values transmitted to the transmitter side in step (c) are the channel sums or channel norms of the transmitting antennas.

11. The method according to claim 8, wherein the channel norms are calculated by the following equations:

$$CHNorm_{T_j} = \sum_{m=1}^{N_R} \|H_{mj}\|^2, j = 1, 2, \ldots, N_T,$$

and $$CHNorm_{R_i} = \sum_{n=1}^{N_T} \|H_{in}\|^2, i = 1, 2, \ldots, N_R,$$

where $CHNorm_{T_j}$ represents the channel norm of a $j^{th}$ transmitting antenna, $CHNorm_{R_i}$ represents the channel norm of an $i^{th}$ receiving antenna, H represents a channel value estimated from the received packet, $N_T$ represents the number of transmitting antennas, and $N_R$ represents the number of receiving antennas.

12. The method according to claim 10, wherein step (c) includes the steps of:
performing channel decoding so as to convert the modulated packet into the original packet;
judging whether the packet is the retransmitted packet or not, and when the packet is the retransmitted packet, combining the packet with a previous packet stored in a buffer of the receiver side; and
extracting a CRC code from the packet, detecting through the extracted CRC code whether or not an error occurs in the data transmitted from each transmitting antenna, setting an ACK value of the transmitting antenna to 1 when an error occurred in the data, and setting The ACK value to 0 when an error did not occurred in the data.

13. The method according to claim 12, wherein in step (c), whether or not to retransmit the packet, which is to be transmitted to the transmitter side, is determined by the ACK value.

14. The method according to claim 13, wherein in step (d), only when one or more of the ACK values received from the receiver side are 1, the packet is retransmitted.

15. The method according to claim 14, wherein step (d) includes the steps of:
when all the ACK values received from the receiver side are 1, arranging the transmitting antennas in magnitude order of the channel sums or channel norms of the transmitting antennas which are transmitted from the receiver side;
selecting an antenna of which the channel Sum or channel norm, is the greatest, among the arranged antennas;
encoding channels by applying the IR scheme to the packet which is to be retransmitted; and
retransmitting the packet through the selected antenna.

16. The method according to claim 14, wherein step (d) includes the steps of
when any one transmitting antenna of which the ACK value is not 1 is present, arranging the transmitting antennas in magnitude order of the channel sums or channel norms of the transmitting antennas which are transmitted from the receiver side;
selecting an antenna of which the channel sum or channel norm is the greatest, among the transmitting antennas of which the ACK value is 0;
encoding a channel by applying the chase combining scheme to the packet which is to be retransmitted; and
retransmitting the packet through the selected antenna.

17. An apparatus for retransmitting data based on antenna scheduling in a MIMO system to which a spatial multiplexing technique is applied, the apparatus comprising:
a transmitter side including:
a packet modulating unit that converts an input packet into transmittable data;
a scheduler that determines whether or not to retransmit the packet and an encoding rate of the packet from a feedback signal transmitted from a receiver side, and delivers a transmitting antenna list, received from the receiver side, to a transmitting antenna designating unit; and
the transmitting antenna designating unit that designates transmitting antennas for transmitting the packet, depending on the transmitting antenna list; and
the receiver side including:
a channel estimator that estimates channel values from the packet transmitted from the transmitter side;
an antenna selecting unit including a channel measurer that calculates channel sums or channel norms from the channel values, and a transmitting/receiving antenna selector that selects a predetermined number of transmitting and receiving antennas in magnitude order of the channel sums or channel norms, wherein the channel sums are calculated by the following equations:

$$CHSum_{T_j} = \sum_{m=1}^{N_R} |H_{mj}|, j = 1, 2, \ldots, N_T,$$

and

-continued $$CHSsum_{R_i} = \sum_{n=1}^{N_T} |H_{in}|, i = 1, 2, \ldots, N_R,$$

where $CHSum_{T_j}$ represents the channel sum of a $j^{th}$ transmitting antenna, $CHSsum_{R_i}$ represents the channel sum of an $i^{th}$ receiving antenna, H represents a channel value estimated from the received packet, $N_T$ represents the number of transmitting antennas, and $N_R$ represents the number of receiving antennas;
a packet demodulating unit that detects whether an error occurs in the packet or not; and
a feedback transmission unit that transmits a feedback signal to the transmitter side, the feedback signal including information on whether or not to retransmit the packet and the transmitting antenna list.

18. The apparatus according to claim 17, wherein the packet modulating unit includes:
a multiplexer that multiplexes the packet into a plurality of data having the same length;
a CRC encoder that adds CRC codes for error detection to the data; and
a channel encoder that corrects errors in the transmitting and receiving.

19. The apparatus according to claim 17, wherein the channel norms are calculated by the following equations:

$$CHNorm_{T_j} = \sum_{m=1}^{N_R} \|H_{mj}\|^2, j = 1, 2, \ldots, N_T,$$

and $$CHNorm_{R_i} = \sum_{n=1}^{N_T} \|H_{in}\|^2, i = 1, 2, \ldots, N_R,$$

where $CHNorm_{T_j}$ represents the channel norm of a $j^{th}$ transmitting antenna, $CHNorm_{R_i}$ represents the channel norm of an $i^{th}$ receiving antenna, H represents a channel value estimated from the received packet, $N_T$ represents the number of transmitting antennas, and $N_R$ represents the number of receiving antennas.

20. The apparatus according to claim 17, wherein the packet demodulating unit includes:
a channel demodulator that converts the packet converted by the channel encoder into the original packet;
a combining section that judges whether the packet is the retransmitted packet or not, and combines the packet with a previous packet stored in a buffer of the receiver side when the packet is the retransmitted packet; and
a CRC decoder that extracts a CRC code from the packet, detects through the extracted CRC code whether or not an error occurs in the data transmitted from each antenna, sets the ACK value of the antenna to 1 when an error occurred in the data, and sets the ACK value of the antenna to 0 when an error did not occur in the data.

21. The apparatus according to claim 20, wherein whether or not to retransmit the packet is determined by the ACK value.

22. The apparatus according to claim 21, wherein only when one or more of the ACK values received from the receiver side are 1, the scheduler performs the retransmitting of the packet.

23. The apparatus according to claim 21, wherein when the ACK values received from the receiver side are all 1, the scheduler applies the IR scheme to the packet which is to be retransmitted, and when any one of the ACK values is 0, the scheduler applies the chase combining scheme to data transmitted through the antenna, of which the ACK value is 0, and applies the IR scheme to data transmitted through the antenna of which the ACK value is 1.

24. An apparatus for retransmitting data based on antenna scheduling in a MIMO system to which a spatial diversity technique is applied, the apparatus comprising:

a transmitter side including:
   a packet modulating unit that converts an input packet into transmittable data;
   a scheduler that determines whether or not to retransmit the packet and an encoding rate of the packet from a feedback signal transmitted from a receiver side, and delivers a transmitting antenna list, received from the receiver side, to a transmitting antenna designating unit; and
   the transmitting antenna designating unit that designates transmitting antennas for transmitting the packet depending on the transmitting antenna list; and the receiver side including:
   a channel estimator that estimates channel values from the packet transmitted from the transmitter side;
   an antenna selecting unit including a channel measurer that calculates channel sums or channel norms from the channel values, and a transmitting/receiving antenna selector that selects a predetermined number of transmitting and receiving antennas in magnitude order of the channel sums or channel norms, wherein the channel sums are calculated by the following equations:

$$CHSum_{T_j} = \sum_{m=1}^{N_R} |H_{mj}|, j = 1, 2, \ldots, N_T,$$

and $$CHSsum_{R_i} = \sum_{n=1}^{N_T} |H_{in}|, i = 1, 2, \ldots, N_R,$$

where $CHSum_{T_j}$ represents the channel sum of a $j^{th}$ transmitting antenna, $CHSsum_{R_i}$ represents the channel sum of an $i^{th}$ receiving antenna, H represents a channel value estimated from the received packet, $N_T$ represents the number of transmitting antennas, and $N_R$ represents the number of receiving antennas;

a packet demodulating unit that detects whether an error occurs in the packet or not; and
   a feedback transmission unit that transmits a feedback signal to the transmitter side, the feedback signal including information on whether or not to retransmit the packet, the transmitting antenna list, and channel state values.

25. The apparatus according to claim 24, wherein the packet modulating unit includes:
   a CRC encoder that adds a CRC code for error detection to the packet; and
   a channel encoder that corrects errors in the transmitting and receiving.

26. The apparatus according to claim 24, wherein the channel state values transmitted to the transmitter side are the channel sums or channel norms of the transmitting antennas.

27. The apparatus according to claim 24; wherein the channel norms are calculated by the following equations:

$$CHNorm_{T_j} = \sum_{m=1}^{N_R} \|H_{mj}\|^2, j = 1, 2, \ldots, N_T,$$

and $$CHNorm_{R_i} = \sum_{n=1}^{N_T} \|H_{in}\|^2, i = 1, 2, \ldots, N_R,$$

where $CHNorm_{T_j}$ represents the channel norm of a $j^{th}$ transmitting antenna, $CHNorm_{R_i}$ represents the channel norm an $i^{th}$ receiving antenna, H represents a channel value estimated from the received packet, $N_T$ represents the number of transmitting antennas, and $N_R$ represents the number of receiving antennas.

28. The apparatus according to claim 26, wherein the packet demodulating unit includes:
   a channel demodulator that converts the packet converted by the channel encoder into the original packet;
   a combining, section that judges whether the packet is the retransmitted packet or not, and combines the packet with a previous packet stored in a buffer of the receiver side when the packet is the retransmitted packet; and
   a CRC decoder that extracts a CRC code from the packet, detects through the extracted CRC code whether an error occurs in the data transmitted from each antenna, sets the ACK value of the antenna to 1 when an error occurred in the data, and sets the ACK value of the antenna to 0 when an error did not occur in the data.

29. The apparatus according to claim 28, wherein whether or not to retransmit the packet, which is to be transmitted to the receiver side, is determined by the ACK value.

30. The apparatus according to claim 29, wherein only when any one of the ACK values received from the receiver side is 1, the scheduler performs the retransmitting of the packet.

31. The apparatus according to claim 30, wherein when the ACK values received from the receiver side are all 1, the scheduler arranges the transmitting antennas in magnitude order of the channel sums or channel norms of the transmitting antennas which are transmitted from the receiver side, selects an antenna of which the channel sum or channel norm is the greatest, and applies the IR scheme to the packet which is to be retransmitted.

32. The apparatus according to claim 30, wherein when all the ACK values received from the receiver side are not 1, the scheduler arranges the transmitting antennas in magnitude order of the channel sums or channel norms of the transmitting antenna which are transmitted from the receiver side, selects an antenna of which the channel sum or channel norm is the greatest among the transmitting antennas of which the ACK value is 0, and applies the chase combining scheme to the packet which is to be retransmitted.

* * * * *